Nov. 23, 1954

J. A. McINTOSH 2,694,860

SLIPPAGE INDICATOR

Filed Oct. 16, 1951

INVENTOR

James A. McIntosh

BY Albin F. Knight

ATTORNEY

Nov. 23, 1954  J. A. McINTOSH  2,694,860
SLIPPAGE INDICATOR
Filed Oct. 16, 1951
2 Sheets-Sheet 2
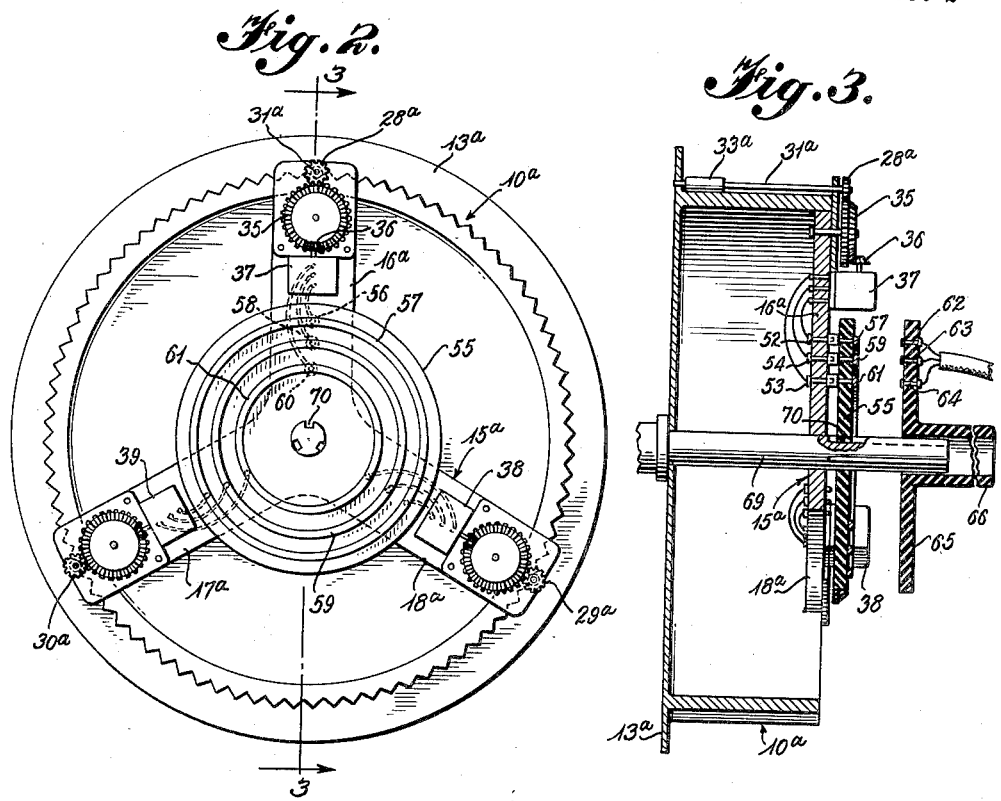
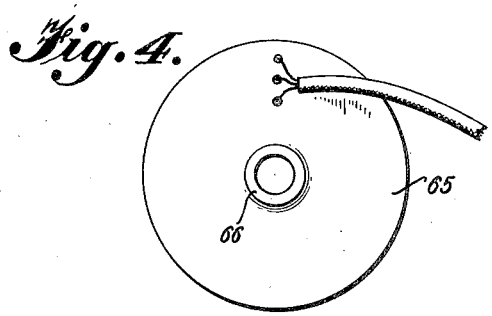
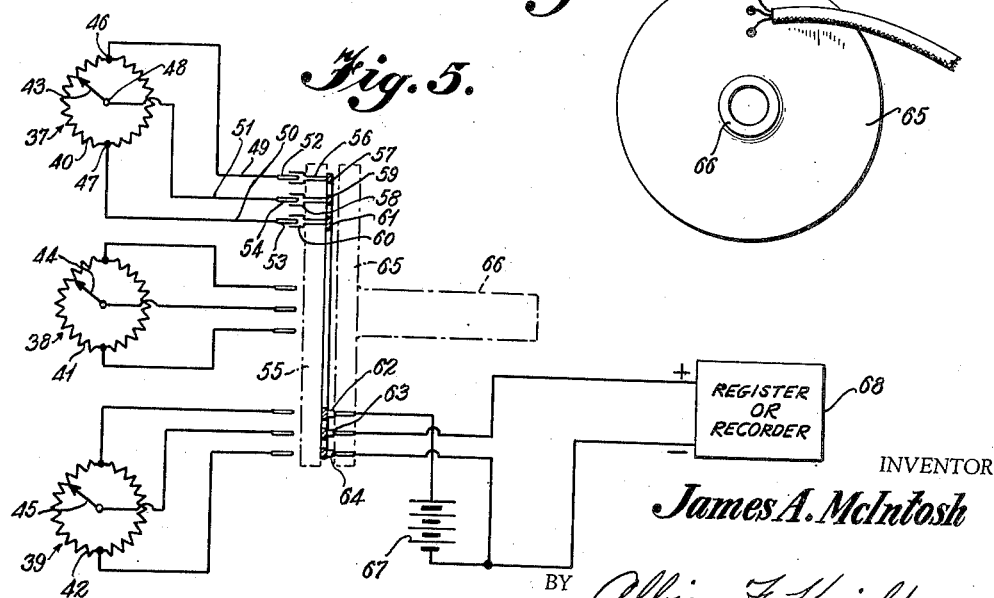
INVENTOR
James A. McIntosh
BY Albin F. Knight
ATTORNEY

United States Patent Office 2,694,860
Patented Nov. 23, 1954

2,694,860
SLIPPAGE INDICATOR

James A. McIntosh, Asheville, N. C., assignor to American Enka Corporation, Enka, N. C., a corporation of Delaware Application October 16, 1951, Serial No. 251,593

10 Claims. (Cl. 33—129)

This invention relates to a slip indicator in association with a thread propelling wheel such as a godet and is more particularly concerned with the individual measurement of the slip of each of several convolutions of thread that may be wrapped around the surface of a single propelling wheel.

In the textile industry many thousands of take-up devices are required to be used to draw and hence propel yarns and threads. These devices have in common the requirement that there be either no slippage thereon or suitable compensation therefor in order that tension of the thread running to the device may be controllable. A classic example is the draw-off godet used in the spinning of rayon where the draw-off speed in correlation with the delivery rate of the spinning pumps controls denier of the warn. A godet is usually comprised of a driven wheel with its axis disposed in convergent relation to an adjacent stationary guide so that the thread passes around the wheel in a generally helical path in the form of three or four axially spaced convolutions. The surface of the wheel is usually provided with axial millings to prevent slippage but these are not fully effective and some slippage occurs. If, after passage over the first godet the yarn is to be stretched in its passage to another godet as is the case in two-bath hot water spinning, it is very important to know the total slippage on each godet and just which convolutions are involved in producing the slip so that adequate adjustments of propelling speed can be made.

The foregoing measurements are very difficult to make and it is an object of this invention to provide apparatus for their easy and accurate measurement.

It is proposed, according to this invention, to provide a direct visual indication of slippage or alternatively to provide electrical impulses functionally related to slippage so that a suitable register or recorder may be operated thereby.

It is a broader object of this invention to provide a device for measuring individual slippage of each of several wraps of yarn passing over the surface of a driven wheel whether the wraps be succeeding lengths of a single yarn or quite separate yarns.

Other objects and advantages of this invention will be apparent upon consideration of the following detailed description of several embodiments thereof in conjunction with the annexed drawings wherein:

Figure 2 is a view in front elevation of a draw-off godet provided with variable potentiometers actuated in response to slip and electrical connections by which the signals varied by the potentiometers may be connected to suitable register or recorder apparatus;

Figure 3 is a view in vertical section of the apparatus of Figure 2 and showing in addition the holder for the brushes by which the resistance modulated signal is taken from the godet to an adjacent or remote recorder or register;

Figure 4 is a front view of the brush holding apparatus shown in Figure 3; and

Figure 5 is a circuit diagram illustrating the electrical connections between the variable potentiometers and the recorder.

Figure 1:
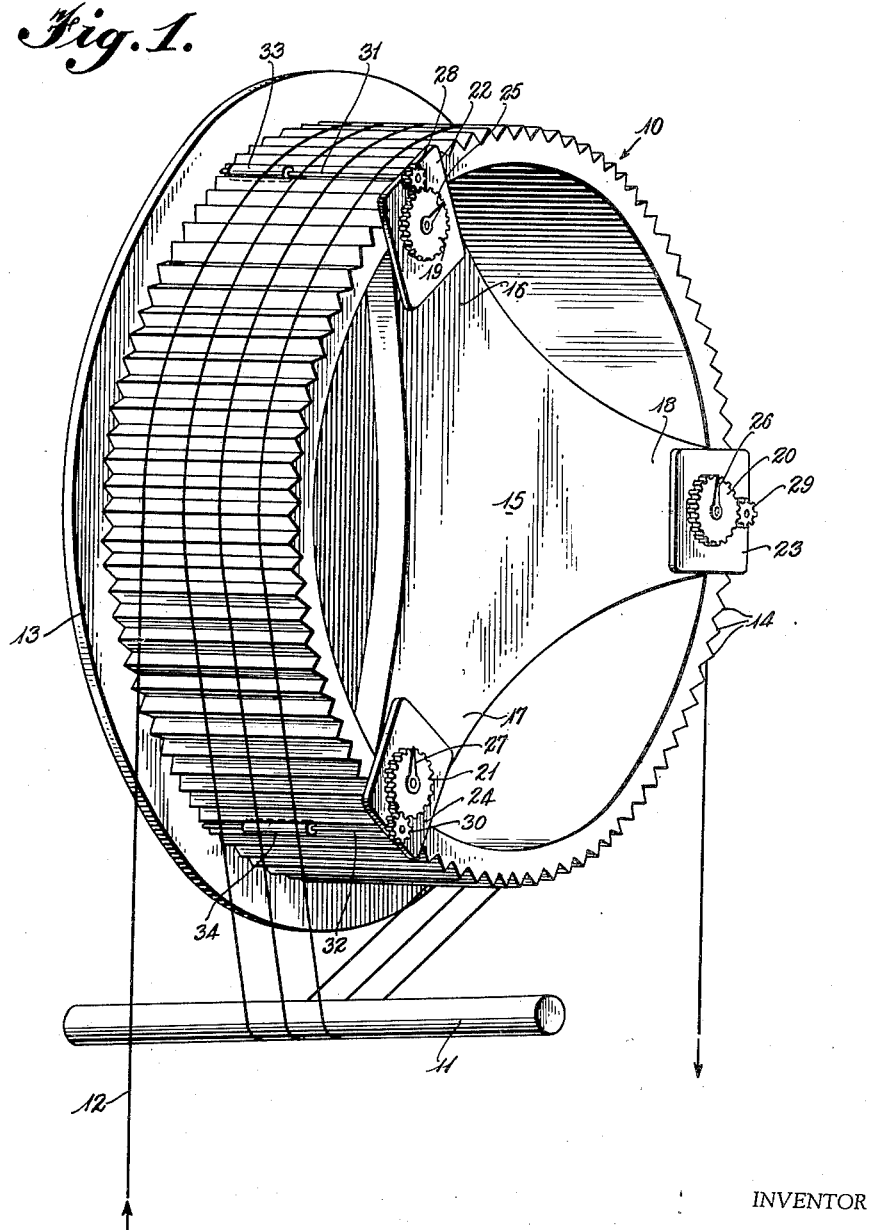
Figure 1 is a perspective view of a draw-off godet provided with direct reading slippage measuring apparatus constructed in accordance with the present invention.

Upon more detailed reference to Figure 1 it will be noted that the godet comprises a hollow wheel 10 and a rod 11. The wheel 10 is driven from a source not shown and is cantilever mounted with its axis convergent to the axis of the rod 11. Because of this arrangement yarn 12 issuing from a source not shown will, if thrice wrapped around the godet, follow a generally helical path with the axial spacing of the coils dependent upon the angle of convergence of the axes of the hollow wheel 10 and the guide rod 11. The hollow wheel 10 is provided with an outwardly extending flange 13 at its supported end and its yarn propelling surface is defined by a number of circumferentially spaced axially extending millings 14.

It will be understood that the structure thus far described is entirely conventional. However, the godet as shown is considerably modified to incorporate the present invention. To this end a three-leg spider 15 is provided adjacent the front of the wheel 10 with the legs fastened against the inner surface of the wheel. On each of the legs, which are designated 16, 17 and 18, there is mounted a dial, 19, 20 and 21, respectively. These dials have calibrated faces and are mounted on plates 22, 23 and 24, respectively, for rotation relative to stationary pointers 25, 26 and 27, respectively. The movement of the rotating dial in relation to the respective pointer is an indication of thread slippage. This indication is possible because the dials 19, 20 and 21 are provided with marginal teeth which mesh with gears 28, 29 and 30, respectively. The gears 28, 29 and 30 are driven by shafts such as 31 and 32, the shaft driving the gear 29 not showing because of the arrangement of the perspective. All three of the shafts are journaled in the supported side of the wheel 10 in the flange 13 and at the unsupported side of the wheel are journaled in the respective bracket 22, 23 or 24. The shafts 31 and 32, as well as the shaft associated with the gear 29, are located in a recess between two of the ridges 14 in such position that the thread running between two adjacent ridges does not contact the shaft. On the other hand, if it is desired to measure slippage of any strand passing in any axial position over any one of the shafts associated with the gears 28, 29 and 30, it is only necessary to key a small sleeve such as the sleeves 33 and 34 to the shaft and to adjust the sleeve axially to lie under the particular strand in contact therewith, slippage of which is sought to be measured.

In the drawing it will be observed that the sleeve 33 on the shaft 31 underlies the first coil of yarn passing over the godet. The second coil of yarn contacts the sleeve 34 on the shaft 32 and the third coil of yarn contacts the sleeve which is associated with the shaft which drives the gear 29. If it is desired to measure the fourth coil, a fourth indicator can be used by using a four-leg spider and if it is desired to measure the algebraic sum of the slippage of two adjacent coils, the sleeve can be adjusted as to length to lie under two of them.

It can be seen that the sleeves such as 33 and 34 project radially beyond the ridges 14 and hence are rotated by the thread if the thread slips. If it does not, the sleeves are not rotated, the respective gears are not rotated, the dials are not rotated and no indication of slippage appears.

With the godet operating at a draw-off speed of 60 to 90 meters a minute, the dials have to be read stroboscopically and to this end the dials are provided with white lines whereby the number of times they pass the stationary pointer can be counted.

In view of the fact that any sort of register which has to be read stroboscopically is subject to visual error on the part of the reader, it has been found desirable, where very accurate measurements are to be made, to register slippage on a remote electrically operated register or recorder. To this end the present invention contemplates the apparatus illustrated in Figures 2 to 5 inclusive. In these figures, parts which correspond to like parts of Figure 1 bear like numbers with the suffix "a" and new parts not common to Figure 1 are distinctly numbered.

Referring more particularly to Figures 2 and 3, the godet 10a having the flange 13a and the spider 15a with legs 16a, 17a and 18a corresponds structurally and functionally to the godet of Figure 1. Three shafts such as 31a in Figure 3 having sleeves thereon such as 33a in Figure 3 are provided at circumferentially spaced points around the godet and each shaft is provided with a gear 28a, 29a and 30a respectively. These gears, instead of driving dials as do the corresponding parts in Figure 1, drive the movable parts of a 360° variable potentiometer, which is structurally of the appearance indicated in Figures 2 and 3 and functionally of the characteristics shown in Figure 5. The gear 28a drives a gear 35 which is a combined pinion and bevel gear. The pinion surface meshes with the gear 28a while the bevel surface of the gear 35 meshes with a corresponding bevel gear 36 attached to the movable part or sweep arm of a variable potentiometer 37. Similar gearing connects gear 29a to variable potentiometer 38 and gear 30a to variable potentiometer 39. It is now apparent that when the shafts such as 31a are driven because of slippage the appropriate potentiometer is varied in proportion to the magnitude of the angular displacement of its sweep arm.

If now reference is made to Figure 5 it will be noted that the potentiometers 37, 38 and 39 are constituted of annular resistances 40, 41 and 42 respectively, coacting with rotating contact arms 43, 44 and 45 respectively, the contact arms being mounted on the shafts which are driven by gears 36 and the equivalent gears for the potentiometers 38 and 39. In view of the fact that the hook-up of the three potentiometers is identical, the following description will be specific to the potentiometer 37 with the understanding that it is fully applicable likewise to the potentiometers 38 and 39.

The potentiometer 37 is provided with two taps 46 and 47 on the resistance ring, these two taps lying 180° apart in the path of the contact arm 43. A third tap 48 is connected to the contact arm 43 and leads 49, 50 and 51 pass down the spider arm 16 and to plugs 52, 53 and 54 that are mounted to register with complementary sockets on the back of a disc-like commutator 55, the sockets connecting through the disc to rings on the fact of the commutator.

As can be seen in Figure 5 the socket 56 connects with the ring 57, the socket 58 with the ring 59, and the socket 60 with the ring 61. The three rings register with brushes 62, 63 and 64 which are supported on a brush-holding disc 65 having a hollow handle 66. The lead from the brush 62 is carried to one side of a potential source 67, which is diagrammatically indicated as a battery. The lead from the brush 62 is divided and one side is lead to the battery 67 and the other side goes to a register or recorder 68. The lead from the brush 63 goes direct to the register or recorder 68.

It can now be seen that current from the battery 67 flows through the brush 62, through the ring 61, through the socket and plug 60—53 to the tap 47 on the resistance ring 40. The other side of the battery is connected through the brush 64, the ring 57 and the plug and socket 56—52 to the top 46 of the resistance ring 40. The tap 48 of the sweep arm 43 of the variable potentiometer is connected through the plug and socket 54—58 to the ring 59 and the brush 63 direct to the recorder. The result of these connections is that when the sweep arm 43 is in contact with the tap 47 the full potential of the battery is impressed across the recorder. When the sweep arm 43 is in contact with the tap 46 the full resistance of the potentiometer is in series (as two parallel branches) with the register-recorder 68 and, in other positions, the resistance is proportionally included with the result that the curve of resistance which the potentiometer puts in series with the register or recorder is a full sine wave for 360° of movement. This variation of resistance can be used to modulate a signal generated in a register or recorder and the output signal can be read in any of many ways available to the art and constituting no part of the present invention.

From the foregoing description, it is apparent that the sockets 56, 58 and 60 must register with the plugs 52, 54 and 53 if the output from the potentiometer 37 is to be registered or recorded. Similarly if the output from either of the potentiometers 38 or 39 is sought to be registered, it is necessary to turn the commutator disc so that the sockets 56, 58 and 60 register with the plugs 52, 54 and 53, respectively, for the appropriate potentiometer. In order that this may be accomplished the godet is provided with a central shaft 69 having keyways 120° apart for coaction with a pin or spline 70 which extends radially into a central aperture of the commutator disc 55. Thus, to vary the particular potentiometer from which a reading is sought, the disc 55 is shifted to the right of its position in Figure 3 until it clears the end of the shaft 69 and then is pressed on in a new circumferential position to register the sockets with the appropriate plugs. It is of course necessary to stop the godet to make this adjustment but the readings must be taken when the godet is operating. Accordingly, the brush disc 65 is provided with the handle 66 which is internally hollow and a smooth-clearance fit over the shaft 69 so that when the apparatus is in operation and the godet is turning the operator needs only to press the disc 65 until the brushes contact the rings whereupon a reading may be taken. It will of course be understood that the operator holds the portion 66 of the disc in his hand stationary while the godet rotates.

While the foregoing invention has been described with regard to godets where succeeding lengths of a single thread pass over the wheel in axially spaced relation, it will be observed that the apparatus is readily adaptable to measuring the relative slippage of several separate yarns or threads which may be propelled across a single wheel. The advantage of the sleeves such as 33 or 34 which lie in different axial positions on the surface of the godet resides in their axial adjustability for simultaneous measurement of the slippage of wraps or coils of thread which are axially spaced on the wheel.

What is claimed is:

1. In combination with a yarn propelling wheel having yarn contacting surfaces around the periphery thereof, a device for measuring slippage of yarn passing around the wheel which comprises rotatable means mounted at the periphery of the wheel and adapted to underlie and be in contact with yarn passing around the wheel, said rotatable means being normally stationary about its own axis but rotatable when yarn slippage occurs on the yarn contacting surfaces and means driven by said rotatable means to measure and visually indicate the magnitude of its rotation.

2. In combination with a yarn propelling wheel having yarn contacting surfaces around the periphery thereof, a device for measuring slippage of yarn passing around the wheel which comprises rotatable means mounted at several points around the periphery of the wheel and adapted to underlie and be in contact with yarn passing around the wheel, each said rotatable means being normally stationary about its own axis but rotatable when yarn slippage occurs on the yarn contacting surfaces and means connected to each of said rotatable means to individually measure and visually indicate the magnitude of its rotation.

3. In combination with a yarn propelling wheel having yarn contacting surfaces defined by a number of circumferentially spaced axially extending ridges around the periphery thereof, a device for measuring slippage of yarn passing around the wheel which comprises a rotatable shaft mounted between two of said ridges, a sleeve mounted upon said shaft and keyed thereto which is shorter than the shaft and extends radially beyond the ridges, said shaft and sleeve being normally stationary about their common axis but rotatable when yarn slippage occurs on the yarn contacting surfaces and means driven by said sleeve to measure the magnitude of its rotation.

4. In combination with a yarn propelling wheel having yarn contacting surfaces around the periphery thereof, a device for measuring slippage of yarn passing around the wheel which comprises rotatable means mounted at the periphery of the wheel and adapted to underlie and be in contact with yarn passing around the wheel, said rotatable means being normally stationary about its own axis but rotatable when yarn slippage occurs on the yarn contacting surfaces and means mounted on said wheel connected to, and driven by, said rotatable means to measure and visually indicate the magnitude of its rotation.

5. In combination with a yarn propelling wheel having yarn contacting surfaces around the periphery thereof, a device for measuring slippage of yarn passing around the wheel which comprises rotatable means mounted at several points on the periphery of the wheel and adapted to underlie and be in contact with yarn passing around the wheel, each said rotatable means being normally stationary about its own axis but rotatable when yarn slippage occurs on the yarn contacting surfaces and means mounted on said wheel connected to, and driven by, each of said rotatable means to individually measure and indicate the magnitude of its rotation.

6. In combination with a yarn propelling wheel having yarn contacting surfaces around the periphery thereof, a device for measuring slippage of yarn passing around the wheel which comprises spaced rotatable shafts mounted at several points around the periphery of the wheel, a sleeve mounted upon each shaft and keyed thereto, each said shaft and sleeve being normally stationary about their common axis but rotatable when yarn slippage occurs on the yarn contacting surfaces, and a plurality of registering devices mounted on said wheel, each connected in driven relation to one of said shafts.

7. In combination with a yarn propelling wheel having yarn contacting surfaces defined by a number of circumferentially spaced axially extending ridges around the periphery thereof, a device for measuring slippage of yarn passing around the wheel which comprises spaced rotatable shafts mounted at several points around the periphery of the wheel, each between two of said ridges, a sleeve mounted upon each shaft and keyed thereto, each said shaft and sleeve being normally stationary about their common axis but rotatable when yarn slippage occurs on the yarn contacting surfaces, a plurality of registering devices mounted on said wheel, each connected in driven relation to one of said shafts, and each registering device comprising a gear indicator wherein the gears establish a driving connection between each shaft and its registering device.

8. In combination with a yarn propelling wheel having yarn contacting surfaces around the periphery thereof, a device for measuring slippage of yarn passing around the wheel which comprises means rotatable in response to slippage, electrical signal varying means mounted on said wheel and connected to be driven by said rotatable means, a commutator on said wheel connected to said signal varying means, brushes in contact with said commutator, a register, and means connected to said brushes to energize said signal varying means and to impress the varied signal on said register.

9. In combination with a yarn propelling wheel having yarn contacting surfaces around the periphery thereof, a device for measuring slippage of yarn passing around the wheel which comprises means rotatable in response to yarn slippage, a variable potentiometer carried by the wheel and connected to be driven by said rotatable means, a commutator on said wheel, brushes in contact with said commutator and registering means connected to the brushes to register the signal impressed thereon as a result of modification in the position of the potentiometer brought about by yarn slippage.

10. In combination with a yarn propelling wheel having yarn contacting surfaces around the periphery thereof, a device for measuring slippage of yarn passing around the wheel which comprises spaced rotatable shafts mounted at several points around the periphery of the wheel, a sleeve mounted upon each shaft and keyed thereto, each said shaft and sleeve being normally stationary about their common axis but rotatable when yarn slippage occurs on the yarn contacting surfaces, a plurality of variable potentiometers mounted on said wheel each connected in driving relation to one of said shafts, a commutator mounted on said wheel and adjustable to connect with any of the potentiometers, a guide shaft cantilever mounted to extend from said wheel, a brush holder slidable on said guide shaft to a position with its brushes in contact with said commutator and a register connected to said brushes to register potentiometer variation in response to slippage.

References Cited in the file of this patent

UNITED STATES PATENTS

| Number | Name | Date |
|---|---|---|
| 122,236 | Dunn | Dec. 26, 1871 |
| 243,831 | Barnes | July 5, 1881 |
| 359,402 | Paff | Mar. 15, 1887 |
| 1,052,125 | Boos | Feb. 4, 1913 |
| 1,437,353 | Parker | Nov. 28, 1922 |
| 1,508,121 | Olsen | Sept. 9, 1924 |
| 2,259,202 | Cooper | Oct. 14, 1941 |
| 2,576,233 | Lorig | Nov. 27, 1951 |

FOREIGN PATENTS

| Number | Country | Date |
|---|---|---|
| 570,056 | Germany | Feb. 22, 1933 |